United States Patent [19]

Goodman

[11] 3,968,261

[45] July 6, 1976

[54] METHOD AND COMPOSITION FOR PREPARING A WHIPPED SALAD DRESSING

[75] Inventor: Louis P. Goodman, Lake Hiawatha, N.J.

[73] Assignee: Kraftco Corporation, Glenview, Ill.

[22] Filed: July 9, 1975

[21] Appl. No.: 594,197

[52] U.S. Cl. .................................. 426/98; 426/564; 426/613
[51] Int. Cl.² ............................................. A23L 1/24
[58] Field of Search .............. 426/98, 564, 613, 570

[56] References Cited
UNITED STATES PATENTS

| | | | |
|---|---|---|---|
| 2,844,470 | 7/1958 | Akerboom | 426/564 |
| 3,295,986 | 1/1967 | Saslaw | 426/98 |
| 3,560,220 | 2/1971 | Bangert | 426/98 |

*Primary Examiner*—Jeanette M. Hunter
*Attorney, Agent, or Firm*—Fitch, Even, Tabin & Luedeka

[57] ABSTRACT

A dry, particulate composition is prepared. When the dry, particulate composition is reconstituted with a liquid and whipped, the whipped composition is suitable for blending with pourable salad dressings to provide a whipped salad dressing. The composition includes a hard fat and a liquid vegetable oil. Both the hard fat and the liquid vegetable oil are encapsulated within a proteinaceous film.

22 Claims, No Drawings

METHOD AND COMPOSITION FOR PREPARING A WHIPPED SALAD DRESSING

The present invention is directed to a method and composition for converting pourable salad dressings to a whipped salad dressing product. More particularly, the present invention is directed to a composition which can be whipped after reconstitution and to a method for using the whipped composition in combination with a pourable salad dressing so as to provide a salad dressing product with whipped properties.

Pourable salad dressings are well-known products of commerce. By the term "pourable salad dressing" is meant those salad dressings which are readily pourable from a container and which are a homogeneous, emulsified mixture of oil and water. Pourable salad dressings are distinguished from non-pourable salad dressings, such as mayonnaise, and are also distinguishable from non-emulsified, two-phase salad dressings which must be shaken prior to use to mix the phases. A large variety of pourable salad dressings are available on the market. Most of the commercially available pourable salad dressings are characterized by a smooth, creamy appearance with no overrun. It would be advantageous to provide pourable salad dressings which are characterized by a fluffy, whipped appearance and some level of overrun. Accordingly, it would be desirable to provide a means whereby commercially available pourable salad dressings can be converted to a whipped salad dressing product with some level of overrun.

Accordingly, it is a principle object of the present invention to provide a method and composition for use in combination with pourable salad dressings to provide a whipped salad dressing product. It is another object of the present invention to provide a dry, particulate composition which can be reconstituted with a suitable liquid and blended with pourable salad dressings. It is a further object of the present invention to provide a method for the preparation of a dry, particulate base composition which can be blended with flavoring materials, reconstituted with various liquids and whipped to provide an additive for pourable salad dressings.

These and other objects of the present invention will become more apparent from the following detailed description and the accompanying claims.

Generally, in accordance with various features of the present invention, a dry, particulate composition is prepared by the method of the invention. When the dry, particulate composition is reconstituted with a liquid and whipped, the whipped composition is suitable for blending with pourable salad dressings to provide a whipped salad dressing.

In general, the dry, particulate composition includes a hard fat and liquid vegetable oil. Both the hard fat and the liquid vegetable oil are encapsulated within a proteinaceous film. The ratio of the hard fat to the liquid oil is in the range of from about 1 : 1 to about 1 : 2 on a weight basis.

The composition further includes non-fat milk solids, a lactylated monoester whipping agent, a proteinaceous film forming agent and a hydrocolloid.

The composition may also include flavoring materials, such as edible acids, sweetening agents, salt, artificial flavors and natural flavors, preservatives and antioxidants.

The hard fat used in the base composition of the invention is selected from animal fats and hydrogenated vegetable and fish oils having an S.F.I. in the range of from about 50 to about 70 at 70°F. and an I.V. within the range of from about 3 to about 15. Preferred hard fats are obtained from butter fat, tallow, lard, soy bean oil, coconut oil, palm oil, babassu oil, cottonseed oil, palm kernel oil, sunflower oil, corn oil, safflower oil, rape seed oil and liquid shortenings having an S.F.I. in the range of from about 0 to about 10 at 70°F. and an I.V. of from about 50 to about 130. It should be understood that the liquid oil can have hard fat incorporated therein so long as the liquid oil meets the overall qualifications in respect to S.F.I. and I.V. Preferred liquid oils are soy bean oil, cottonseed oil, corn oil, sunflower oil, safflower oil and rape seed oil. The hard fat is present in the composition at a level of from about 12 to about 22 percent. The liquid oil is present at a level of from about 20 to about 30 percent.

As indicated, the ratio of hard fat to liquid oil in the range of from about 1:1 to about 11:2 on a weight basis. The ratio of hard fat to liquid oil is important to attain storability of the finished whipped salad dressing product including the composition of the invention blended therein.

An aqueous emulsion of the hard fat and liquid oil is pepared under particular conditions. A proteinaceous film forming agent is included in the emulsion. Thereafter, when the composition is spray dried, the liquid oil and hard fat are encapsulated within the proteinaceous film forming agent. Preferred proteinaceous film forming agents for encapsulation of the fat are sodium caseinate and the sodium salt of isolated soy bean protein, which may be supplimented with skim milk solids. The proteinaceous film forming agent is present in the composition at a level of from about 4 to about 6 percent. All parts and percentages used herein are by weight unless otherwise indicated.

It has been found that when the proteinaceous film forming agent is present within the indicated range the encapsulation of the hard fat and liquid oil is such that a portion of the hard fat and liquid oil are prone to fat churn-out. In this connection, during reconstitution and whipping of the dry compositions of the invention a substantial proportion of the encapsulated fat particles are ruptured to provide a fat churn-out of from about 15 to about 30 percent by weight of the total fat present. By the term "churn-out" is meant a partial phase inversion in the emulsion.

Non-fat milk solids are used in the composition to provide a creamy appearance when the composition is reconstituted and whipped. The non-fat milk solids also function as a buffering agent to prevent acid destabilization by the pourable salad dressing of the whipped, reconstituted composition when the whipped, reconstituted composition is mixed with a pourable salad dressing. The non-fat milk solids also tend to prevent acid destabilization of the composition during preparation and whipping thereof when an edible acid is present in the composition. Non-fat milk solids are present in the composition at a level of from about 15 to about 20 percent.

The lactylated monoester whipping agent provides desired dispersibility, reconstitution and whipping properties for the composition of the invention when the composition is reconstituted. The particular whipping agent of the invention also stabilizes the aqueous emulsion during processing and drying. The lactylated monoester whipping agent is selected from commercially available lactylated mono fatty acid esters of glycerol and lactylated mono fatty acid esters of propylene glycol. The fatty acid moiety of the monoester is generally selected from the group consisting of stearic acid, oleic acid, palmitic acid, myristic acid and mixtures thereof. A particularly preferred whipping agent is lactylated propylene glycol monostearate. A suitable lactylated propylene glycol monostearate is available under the trademark Durlac 300 from Durkee Famous Foods. The lactylated monoester whipping agent is present in the composition at a level of from about 5 to about 20 percent. The lactylated monoester whipping agent is preferably used in combination with mono and di-glycerides. When mono- and di-glycerides are used they are present in the composition at a level of from about 4 to about 10 percent and the lactylated monoester is present at a level of from about 8 to about 14 percent.

A hydrocolloid is used in connection with encapsulation and to stabilize the foam structure which is established when the reconstituted composition is whipped. The hydrocolloid is selected from stabilizers which are known for use in food compositions. In this connection, the hydrocolloid is preferably selected from the group consisting of carrageenan, locust bean gum, microcrystalline cellulose, guar gum, gelatin, xanthan gum and mixtures thereof. The hydrocolloid is present in the composition at a level of from about 0.3 to about 0.6 percent.

For organoleptic purposes, an edible acid is preferably present in the composition at a level sufficient to provide a pH of from about 3 to about 6 when the composition is reconstituted with two parts by weight of water per part by weight of the composition. Suitable edible acids are citric acid, acetic acid, succinic acid, tartaric acid, lactic acid, malic acid, fumaric acid, phosphoric acid and mixtures thereof.

A sweetening agent other than the lactose from nonfat milk solids is preferably present in the composition at a level of from about 10 to about 20 percent. Preferably the sweetening agent is a mixture of a disaccharide sugar and a monosaccharide sugar. The monosaccharide sugar is preferably dextrose and the disaccharide sugar is preferably sucrose. The monosaccharide sugar is preferably present in the composition at a level of from about 8 to about 15 percent and the disaccharide sugar is preferably present in the composition at a level of from about 2 to about 8 percent.

The dry composition can be reconstituted with a suitable liquid, such as water, milk, skim milk, buttermilk, fruit juices, vegetable juices, and mixtures thereof. A preferred liquid is water.

In preparing the dry, particulate composition of the invention, a loose emulsion is first prepared. Water is present in the loose emulsion at a level of from about 40 to about 80 percent. The loose emulsion is homogenized at a particular homogenization pressure to provide an aqueous emulsion and the aqueous emulsion is spray dried to provide the dry, particulate composition. In general, it is preferred to heat the hard fat and liquid oil to a temperature such that the hard fat is melted. This will generally be a temperature above about 120°F and in the range of 120°–160°F. The remaining components of the composition and water are added to the heated hard fat and liquid oil while agitation is maintained. A loose emulsion is formed after addition of the final ingredient and the loose emulsion is then homogenized to provide an aqueous emulsion suitable for spray drying to provide the composition of the invention. After the homogenization step, the aqueous emulsion is spray dried. It is preferred that the dry composition exit from the spray dryer at a temperature below about 180°F, preferably in the range of 150°F–180°F. If the dried composition reaches a temperature above about 180°F while being dried, the fat encapsulation process is disturbed and caking may occur.

It has been found that it is important to use two stage homogenization and a total homogenization pressure in the range of 1,000 psig. to about 2,500 psig. to provide the composition of the invention with the desired characteristics in terms of fat churn-out and foam stiffness. In this connection, the fat churn-out of the reconstituted, dry composition when whipped, should be in the range of 10–30 percent of the total fat. The foam stiffness should be in the range of a 10–20 unit reading on a Brookfield RVT Type viscosity instrument using a 20 millimeter T bar spindle in Helipath suspension at 2.5 r.p.m. rotational speed.

The dry composition can be blended, either before or after reconstitution, with suitable spices and flavors to provide a flavored substrate suitable for combination with any harmonizing flavor of pourable salad dressing.

The dry composition is reconstituted with from about 1.8 to about 2.2 parts of water per part of the composition. At this level of reconstitution, the composition after whipping will attain an overrun in the range of from 160–200 percent. It has been found that this level of overrun is desirable for providing whipped salad dressing products in accordance with the invention. The whipped, reconstituted composition is suitable for blending with from about 2 to about 4 parts of pourable salad dressing per part of the composition.

The following example further illustrates various features of the present invention but is intended to in no way limit the scope of the invention as defined in the appended claims.

EXAMPLE

A dry, particulate, base composition is prepared in accordance with the invention. The wet emulsion for preparing the composition has the following ingredients at the indicated levels.

| Ingredient | Weight Percent |
| --- | --- |
| Soy Bean Oil (2 SFI at 70°F; 112 I.V.) | 8.73 |
| Hydrogenated Soy Bean Oil (60 SFI at 70°F; 5 I.V.) | 5.82 |
| Sodium Caseinate | 1.76 |
| Non-Fat Milk Solids | 0.30 |
| Lactylated Propylene Glycol Monostearate | 3.43 |
| Mono- and di-glycerides | 2.17 |
| Water | 11.00 |
| Sucrose | 1.53 |
| Citric Acid | 0.19 |
| Disodium Hydrophosphate | 0.22 |

| Ingredient | Weight Percent |
| --- | --- |
| Carrageenan | 0.03 |
| Locust Bean Gum | 0.03 |
| Microcrystalline Cellulose | 0.09 |
| Corn Syrup Solids (42 DE) | 4.48 |
| Skim Milk fortified With 1% Non-Fat Milk Solids (10% total solids) | 59.79 |
| Vinegar (100 grain) | 0.37 |
| Antioxidant | 0.0009 |
| Lecithin | 0.06 |

An aqueous emulsion is prepared as follows:

The liquid oil and hard fat are added to a jacketed kettle equipped with a scraper. The mixture of hard fat and liquid oil is heated to a temperature of 130°F with agitation. Thereafter, the lecithin, antioxidant, lactylated propylene glycol monostearate and mono- and di-glycerides are added in sequence with agitation. The non-fat dry milk and sodium caseinate are then added and dispersed in the mixture. The water is heated to a temperature of 120°F and is added to the mixture. The mixture in the kettle is then heated to a temperature of 160°F. The skim milk, at a temperature 45°F, is slowly added to the mixture in the kettle at a rate sufficient that the temperature in the kettle is maintained above 120°F.

A dry mix is prepared of sucrose, corn syrup solids, citric acid, disodium hydrophosphate, microcrystalline cellulose, carrageenan and locust bean gum. The dry mix is added to the mixture in the kettle with agitation. The vinegar is then added.

The mixture in the kettle is stirred as the temperature is brought up to 160°F. The mixture is held in the kettle at 160°F for 20 minutes to pasteurize the mixture.

Thereafter, the mixture is homogenized at 1500 psig. to provide an aqueous emulsion.

The aqueous emulsion is spray dried in a 5 foot diameter sprayer dryer. The aqueous emulsion is maintained at a temperature in the range of 150°-160°F during the spray drying. The aqueous emulsion was spray dried under the following conditions:

Inlet air temperature – 275°F – 310°F
Outlet product temperature – 175°F – 176°F
Pump pressure – 2400 psig.

A spray dried powder is collected in bags and allowed to cool to room temperature.

The spray dried powder is then blended with a spice mixture to provide a blue cheese flavor composition.

The flavored composition is then reconstituted by adding 2 parts of water by weight to 1 part by weight of the flavored composition. The water and the composition are stirred by hand to provide a slurry. Whipping of the slurry is effected by use of a planetary type mixer equipped with a wire whip. The overrun of the whipped composition is 180%. The foam stiffness is measured on a Brookfield RVT Type instrument using a 20 millimeter T bar spindle in Helipath suspension at 2.5 R.P.M. rotational speed. The foam stiffness is 14 units on the Brookfield scale. The fat churn-out is determined and is found to be 20%.

The whipped composition is then combined with a blue cheese flavored pourable dressing at a level of 0.3 parts by weight of the whipped composition per part by weight of the pourable dressing. A light, whipped blue cheese flavor salad dressing is obtained.

What is claimed is:

1. A dry, particulate, composition which when reconstituted and whipped is adapted for blending with pourable salad dressings to provide a whipped salad dressing said composition comprising a hard fat having an SFI in the range of from about 50 to 70 at 70°F and an I.V. in the range of from about 3 to 15, a liquid oil having an SFI in the range of from about 0 to 10 at 70°F and an I.V. in the range of from about 50 to 130, the ratio of said hard fat to said liquid oil being from about 1:1 to about 1:2 on a weight basis, monoester whipping agent, a proteinaceous film forming agent, and a hydrocolloid, said fat and said oil being encapsulated in said proteinaceous film forming agent.

2. A composition in accordance with claim 1 wherein said film forming agent is selected from sodium caseinate and the sodium salt of isolated soy bean protein.

3. A composition in accordance with claim 1 wherein said composition further comprises non-fat milk solids at a level of from about 15 to about 20 percent by weight.

4. A composition in accordance with claim 1 wherein said hard fat is present at a level of from about 12 to about 22 percent by weight and said liquid oil is present at a level of from about 20 to about 30 percent by weight.

5. A composition in accordance with claim 1 wherein said lactylated monoester whipping agent is selected from lactylated mono fatty acid esters of glycerol and lactylated mono fatty acid esters of propylene glycol.

6. A composition in accordance with claim 5 wherein the fatty acid moiety of the monoester is selected from the group consisting of stearic acid, oleic acid, palmitic acid, myristic acid and mixtures thereof.

7. A composition in accordance with claim 6 wherein said lactylated monoester is propylene glycol monostearate.

8. A composition in accordance with claim 1 which further comprises a sweetening agent at a level of from about 10 to about 20 percent.

9. A composition in accordance with claim 1 which further comprises an edible acid, said edible acid being present at a level sufficient to provide a pH of from about 3 to about 6 when the composition is reconstituted with two parts by weight of water per part by weight of the composition.

10. A composition in accordance with claim 1 wherein said hydrocolloid is present at a level of from about 0.3 to about 0.6 percent by weight.

11. A method for preparing a dry, particulate composition which is adapted to be reconstituted with a suitable liquid, whipped and blended with a pourable salad dressing to provide a whipped salad dressing product, said method comprising providing a loose emulsion of a hard fat, a liquid oil, skim milk, a proteinaceous film forming agent, a lactylated monoester whipping agent and a hydrocolloid, homogenizing said loose emulsion using two stage homogenization and a total homogenization pressure of less than about 2500 psig to provide an aqueous emulsion and drying said aqueous emulsion by means of a spray dryer to provide a dry, particulate composition.

12. A method in accordance with claim 11 wherein said dry composition exits from said spray drier at a temperature below about 180°F.

13. A method in accordance with claim 11 wherein said total homogenization pressure is in the range of 1,000 psig. to about 2,500 psig.

14. A method in accordance with claim 11 wherein the ratio of said hard fat to said liquid oil is from about 1:1 to about 1:2 by weight, on a dry solids basis.

15. A method in accordance with claim 11 wherein water is present in said aqueous emulsion at a level of from about 40 percent to about 80 percent by weight.

16. A method in accordance with claim 11 wherein said proteinaceous film forming agent is selected from sodium caseinate and the sodium salt of isolated soy bean protein.

17. A method in accordance with claim 11 wherein said lactylated monoester whipping agent is selected from lactylated mono fatty acid esters of glycerol and lactylated mono fatty acid esters of propylene glycol.

18. A method in accordance with claim 17 wherein the fatty acid moiety of the monoester is selected from the group consisting of stearic acid, oleic acid, palmitic acid, myristic acid and mixtures thereof.

19. A method in accordance with claim 18 wherein said lactylated monoester is propylene glycol monostearate.

20. A method in accordance with claim 11 wherein said loose emulsion further comprises a sweetening agent at a level of from about 10 to about 20 percent.

21. A method in accordance with claim 11 wherein said loose emulsion further comprises an edible acid, said edible acid being present at a level sufficient to provide a pH of from about 3 to about 6 when the dry composition is reconstituted with two parts by weight of water per part by weight of the composition.

22. A method in accordance with claim 11 wherein said hydrocolloid is present in said loose emulsion at a level of from about 0.3 to about 0.6 percent by weight on the dry solids basis.

* * * * *